United States Patent [19]

Marshall et al.

[11] Patent Number: 4,678,620
[45] Date of Patent: Jul. 7, 1987

[54] HATCH ASSEMBLY

[75] Inventors: James R. Marshall, Penn Hills; Roy T. Hardin, Jr., Greensburg, both of Pa.

[73] Assignee: Westinghouse Electric Corp., Pittsburgh, Pa.

[21] Appl. No.: 633,812

[22] Filed: Jul. 23, 1984

[51] Int. Cl.$^4$ ............................................. G21C 13/00
[52] U.S. Cl. ................................... 376/203; 376/204; 376/261; 292/139; 292/167; 220/323
[58] Field of Search ............... 376/261, 262, 263, 264, 376/203 I, 204, 287; 292/139, 158, 167; 220/323

[56] References Cited

U.S. PATENT DOCUMENTS

| | | | |
|---|---|---|---|
| 4,053,067 | 10/1977 | Katz | 376/268 |
| 4,099,751 | 7/1978 | Poe | 292/139 |
| 4,450,134 | 5/1984 | Soot | 376/262 |
| 4,519,519 | 5/1985 | Meuschke | 376/204 |

FOREIGN PATENT DOCUMENTS 1614512  9/1970  Fed. Rep. of Germany ...... 376/203

Primary Examiner—Frederick R. Schmidt
Assistant Examiner—Bradley I. Vaught
Attorney, Agent, or Firm—Daniel C. Abeles

[57] ABSTRACT

A hatch assembly has an annular seat, a hatch cover and a plurality of latching units. Each latching unit has a slidably supported locking bolt movable generally radially inwardly with respect to the annular seat into a hatch cover locking position and generally radially outwardly into a hatch cover releasing position. In the hatch cover locking position at least one length portion of the locking bolt extends over the hatch cover for maintaining the hatch cover on the annular seat. Each latching unit further has a rotary crankshaft, an operating handle torque-transmittingly connected to the crankshaft for applying a locking torque and an opposite, releasing torque thereto; and a coupling mechanism for connecting the crankshaft with the locking bolt and for converting rotary motion of the crankshaft to linear motion of the locking bolt. The coupling mechanism has a spring for transmitting the locking torque from the crankshaft as a radially inwardly oriented resilient force to the locking bolt. The radially inwardly oriented resilient force is resolved to a component force with which the locking bolt presses the hatch cover against the annular seat.

15 Claims, 6 Drawing Figures

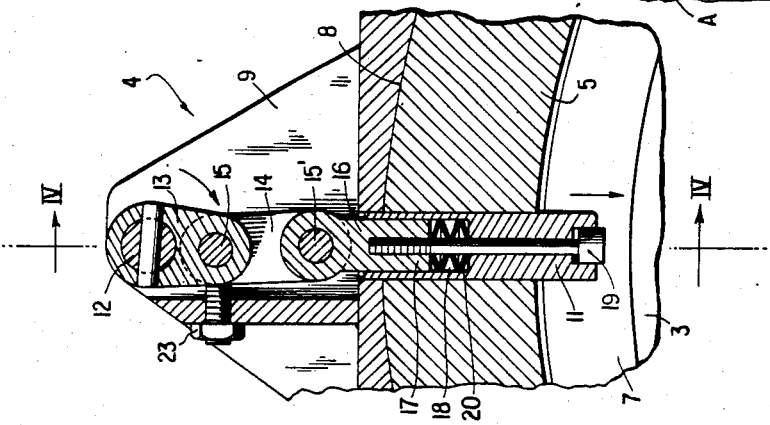
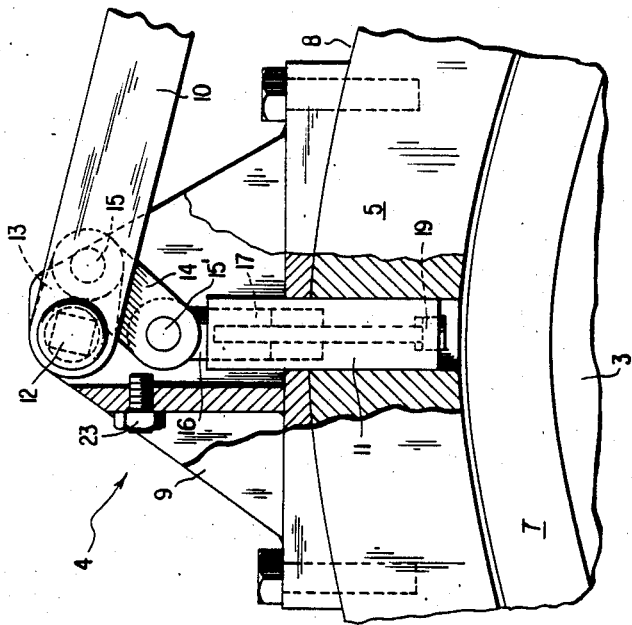

HATCH ASSEMBLY

BACKGROUND OF THE INVENTION

1. Field of the Invention

This invention relates to a hatch assembly, particularly for a nuclear fuel transfer tube connecting the containment area of a nuclear reactor with a fuel handling building. The hatch assembly includes a hatch cover arranged at that end of the fuel transfer tube which opens into the refueling cavity of the nuclear reactor in the containment area. The opposite end of the fuel transfer tube which opens into the fuel handling building is controlled by a motor or handwheel operated valve mechanism. When fuel assemblies are to be replaced in the nuclear reactor, operating personnel enter the dry refueling cavity and remove the hatch cover. Subsequently, the refueling cavity is flooded with water to ensure that the entire fuel replacing process both in the containment area and the fuel handling building is carried out under water. Upon completion of the fuel replacing operation, the refueling cavity is drained and subsequently operating personnel reenter the refueling cavity and reinstall the hatch cover on the end of the fuel transfer tube to thus provide a tight seal thereon for the normal operation of the reactor. A nuclear fuel transfer system of this type is disclosed in U.S. Pat. No. 4,053,067 issued Oct. 11, 1977.

2. Description of the Prior Art

According to a first conventional arrangement, the hatch cover is secured to the end of the fuel transfer tube by means of a plurality (for example, twenty) of axially oriented, circumferentially distributed threaded bolts held in the hatch cover along the periphery thereof. The bolts are received in corresponding threaded bore holes provided in a hatch ring or flange at the end of the fuel transfer tube. According to a second conventional latching arrangement, the hatch cover carries a complex latching mechanism including a plurality of radially outwardly and inwardly slidable locking bolts actuated by a single handwheel located in the center of the hatch cover.

Since operating personnel should spend the shortest possible time in the containment area because of the prevailing relatively high radiation field, the possibility for a rapid-action operation of the hatch cover is highly desirable. Further, since much of the space in the vicinity of the end of the transfer tube in the containment area is taken up by the fuel transfer equipment, a small spatial requirement for handling the hatch cover is desirable.

While a hatch cover according to the above-outlined second conventional construction is an improvement over the first prior art construction as concerns the rapidity of operation and a small spatial requirement, such a hatch cover has the drawback that the latching mechanism incorporated therein has a complex and interrelated structure and thus, a malfunction of a single sliding bolt may jam the entire mechanism, necessitating lengthy repair work. Further, particularly because of the rapid operations that have to be carried out, the hatch cover undergoes significantly rough handling and thus the risks of damage to the latching mechanism carried by the hatch cover are high.

SUMMARY OF THE INVENTION

It is an object of the invention to provide an improved hatch assembly having a hatch cover and a rapid-action latching mechanism which has small spatial requirements for its structure and operation and which is substantially insensitive to a rough handling of the hatch cover.

It is a further object of the invention to provide an improved rapid-action latching mechanism with which an automatically controlled axial closing force can be exerted on the hatch cover.

These objects and others to become apparent as the specification progresses, are accomplished by the invention, according to which, briefly stated, the hatch assembly has an annular seat, a hatch cover and a plurality of latching units. Each latching unit has a slidably supported locking bolt movable generally radially inwardly with respect to the annular seat into a hatch cover locking position and generally radially outwardly into a hatch cover releasing position. In the hatch cover locking position at least one length portion of the locking bolt extends over the hatch cover for maintaining the hatch cover on the annular seat. Each latching unit further has a rotary crankshaft, an operating handle torque-transmittingly connected to the crankshaft for applying a locking torque and an opposite, releasing torque thereto; and a coupling mechanism for connecting the crankshaft with the locking bolt and for converting rotary motion of the crankshaft to linear motion of the locking bolt. The coupling mechanism has a spring for transmitting the locking torque from the crankshaft as a radially inwardly oriented resilient force to the locking bolt. The radially inwardly oriented resilient force is resolved to a component force with which the locking bolt presses the hatch cover against the annular seat.

BRIEF DESCRIPTION OF THE DRAWINGS

FIG. 2 is a partially broken-away front elevational view of a latching unit forming part of the preferred embodiment and illustrated in an open position.

FIG. 3 is a sectional view of the latching unit taken along line III—III of FIG. 4 and shown in a closed position.

FIG. 4 is a sectional view taken along line IV—IV of FIG. 3.

DESCRIPTION OF THE PREFERRED EMBODIMENT

Figure 1:
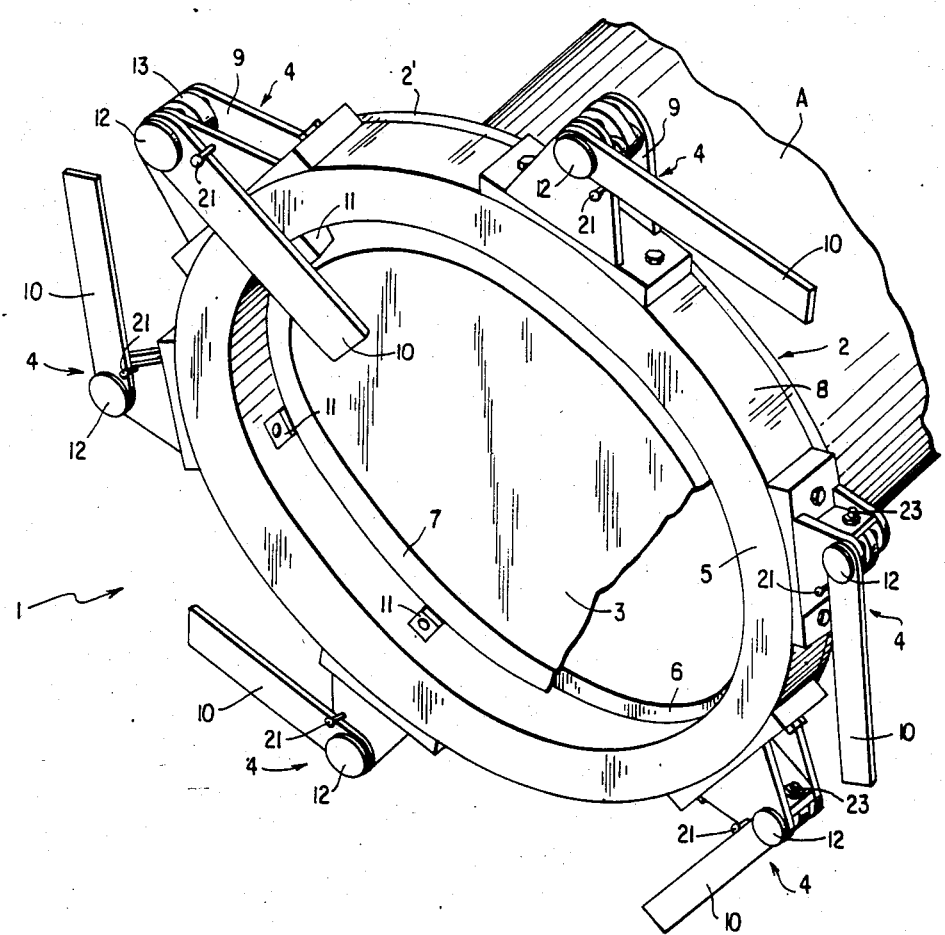
FIG. 1 is a perspective view of a preferred embodiment of the invention.

FIG. 1 illustrates a preferred embodiment of a hatch assembly according to the invention. The hatch assembly generally designated at 1 has three principal parts: a hatch ring 2, a hatch cover 3 and a latching mechanism which is formed of several (for example, six) separate, identical latching units generally designated at 4.

The hatch ring 2 is formed of an annular flange 2' affixed (for example, welded) to a housing or casing A to define an opening therein and a rim 5 mounted, for example, by circumferentially distributed, axially parallel threaded countersunk bolts (not shown) on the flange 2' concentrically therewith. The inner diameter of the rim 5 is greater than that of the flange 2', leaving exposed a radial circumferential flange face portion constituting an annular seat 6.

The hatch cover 3 is essentially a blank disc which fits into the rim 5 of the hatch ring 2 and is adapted to engage the annular seat 6 of the hatch ring 2 in a circumferential, face-to-face contact. The hatch cover 3 has a circumferential bevel 7 on its outwardly oriented surface for a purpose to become apparent as the specification progresses. For moving the hatch cover 3 towards or away from the hatch ring 2, the hatch cover 3 may carry a handle (not shown in FIG. 1) on its outwardly oriented face.

The latching mechanism for tightly pressing the hatch cover 3 against the seat 6 of the hatch ring 2 is formed of the latching units 4 mounted in a uniform circumferential distribution on the outer periphery 8 of the rim 5 of the hatch ring 2. The latching units 4 are of identical construction, each including a support bracket 9 carrying the latching or bolting arrangement which includes a manually engageable operating handle 10 as well as a radially sliding locking bolt 11 which passes through an opening in the rim 5 and which is coupled by a linkage mechanism to the handle 10. The handle 10 is swingable in a plane parallel to the plane of the hatch opening defined by the annular seat 6. It is noted that the upper left-hand latching unit 4 is shown in a closed position, while all the other latching units 4 are illustrated in an open position.

The latching unit 4 will now be described in detail with particular reference to FIGS. 2, 3 and 4.

FIG. 2 illustrates the latching unit 4 in an open state in which the locking bolt 11 is in a withdrawn position. As may be observed in FIG. 1, if the locking bolt 11 of each latching unit 4 is in the withdrawn position, the hatch cover 3 may be moved freely in the axial direction towards or away from the seat 6 of the hatch ring 2.

The handle 10 is torque-transmittingly attached to a crankshaft 12 which journals in an opening provided in the support bracket 9. To the crankshaft 12 there is torque-transmittingly affixed a crank link 13 to which there is eccentrically articulated a connecting link 14 by means of a pivot pin 15 extending spaced from and parallel to the crankshaft 12. To the connecting link 14, in turn, there is articulated a locking bolt pin 16 by means of a pivot pin 15'.

A shank portion 17 of the locking bolt pin 16 extends into an axial opening 18 of the locking bolt 11 for longitudinally sliding therein. A locking bolt screw 19 is axially introduced into the locking bolt 11 at its end remote from the shank portion 17 and is threadedly engaged in a screw hole provided in the end face of the shank portion 17. In this manner, the locking bolt screw 19 secures the locking bolt 11 to the locking bolt pin 16. The space bounded by the axial opening 18 of the locking bolt 11 and the end face of the shank portion 17 accommodates spring washers 20 which provide for a resilient connection between the locking bolt pin 16 and the locking bolt 11 for effecting a controlled locking force as will be described below particularly with reference to FIGS. 3 and 4.

In the open position of the latching unit 4, the handle 10 extends generally perpendicularly to the length dimension of the locking bolt 11. A locking pin 21 supported in the bracket 9 and extending spaced from and parallel to the crankshaft 12 blocks the handle 10 in the open position as shown in FIG. 1.

For placing the latching unit 4 into its closed position, first the locking pin 21 is pulled out to release the handle 10 and thereafter the handle 10 is manually swung clockwise as viewed in FIG. 2 to thus impart a clockwise torque on the crankshaft 12. As a result, the crankshaft 12 and the crank link 13 rigidly affixed thereto execute a clockwise rotation from the position shown in FIG. 2 toward the position shown in FIG. 3.

During the clockwise closing motion of the crankshaft 12 and the crank link 13 the connecting link 14 turns about the pivot pins 15 and 15' which couple the connecting link 14 to the crank link 13 and the locking bolt pin 16, respectively, thus converting the rotary motion of the crank link 13 to a linear motion of the locking bolt pin 16. As a result, the locking bolt pin 16 moves radially inwardly (as viewed relative to the axis of the hatch ring 2) transmitting a linear radial force to the locking bolt 11 with the intermediary of the spring washers 20 which undergo compression in response to the resistance to the radially inward motion of the locking bolt 11. Such a resistance is generated by the camming action between a chamfered surface 22 of the locking bolt 11 and the bevelled surface 7 of the hatch cover 3. It is noted that the spring force exerted by the compressed spring washers 20 to the locking bolt 11 is, at all times during the closing motion and during the closed state of the latching unit 4, greater than the force resisting it, so that the resisting force (due to the camming action between surfaces 7 and 22) will always be overcome by the resilient force exerted by the spring washers 20. In this manner, a controlled, resilient locking force urging the hatch cover 3 against the seat 6 by the camming action between the oblique surfaces 7 and 22 is ensured during the motion from the open position into the closed (latching or bolted) position as well as during the period the bolted position is maintained.

When the closed position of the latching unit 4 is reached as illustrated in FIGS. 3 and 4, the operating handle 10 assumes a radially inward orientation, that is, it extends generally parallel to the longitudinal axis of the locking bolt 11 as shown in FIG. 4 and in FIG. 1 (for the upper left-hand latching unit 4). Thereupon, the locking pin 21 is reinserted in the bracket 9 to thus secure the handle 10 in the closed position of the latching unit 4.

A crank limit screw 23 supported in the bracket 9 and extending generally perpendicularly to the crankshaft 12 and the axis of the hatch ring 2 has an end which is in the path of displacement of the eccentric portion of the connecting link 14 to determine the maximum angle through which the crankshaft 12 may rotate from the open position to an over-the-center closed (bolting) position of the latching unit 4. In this manner, the extent of compression and thus the transmitted spring force of the spring washers 20 in the bolting position may be varied.

While the Figures illustrate a "right-hand" operation for the latching units 4, it will be understood that the structure is capable of "left-hand" operation, in which case the closing motion of the handle 10, the crankshaft 12 and the crank link 13 will be counterclockwise as viewed in FIGS. 1–3. Further, for a "left-hand" operation, the locking pin 21 and the crank limit screw 23 has to be relocated on the bracket 9. It will also be understood that in each latching unit 4 the handle 10 may be omitted and instead, the crankshaft 12 may have a hexagonal terminus for engagement by a standard wrench. In such a modification it is expedient to replace the handle 10 by a short, tab-like part or arm which assumes the function of handle 10 in its cooperation with the locking pin 21 and also acts as a visual indicator of the closed or withdrawn position of the locking bolt 11.

Reverting particularly to FIGS. 1 and 4, after placing all the latching units 4 into the closed position in which the handles 10 are oriented radially inwardly generally parallel to the associated locking bolt 11, the hatch cover 3 is urged with a uniform circumferential camming force axially against the seat 6 of the hatch ring 2. Sealing rings 24 and 25 are arranged on the inwardly oriented surface of the hatch cover 3, concentrically with the axis thereof for sealingly pressing against the seat 6 of the hatch ring 2.

Figure 5:
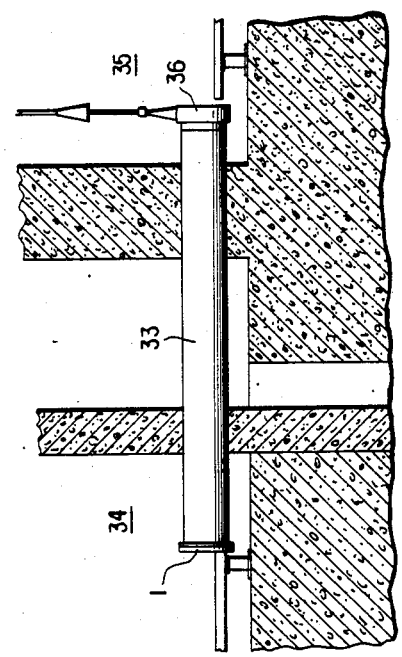
FIG. 5 is a perspective view illustrating a further feature of the preferred embodiment.

Turning now to FIG. 5, the hatch assembly 1 includes a counter weight mechanism generally indicated at 26 for facilitating removal and reinsertion of the heavy hatch cover 3. The mechanism 26 is particularly useful in supporting the hatch cover 3 when removed from the hatch ring 2. It is noted that the latching units 4 are not illustrated in FIG. 5 for the sake of simplicity and clarity. The counter weight assembly 26 comprises an upright support post 27 firmly mounted on the axial peripheral surface 8 of the hatch ring 2 for carrying a pulley bracket 28 which supports two spaced pulleys 29. A cable 30 is trained about the pulleys 29 and carries, at one end, a counter weight 31 and is, at its other end, affixed to a hatch cover handle 32 which, in turn, is secured to the hatch cover 3. The counter weight assembly 26 significantly accelerates and simplifies the removal and reinsertion of the hatch cover 2 and ensures that for clearing the opening defined by the hatch ring 2, the hatch cover 3 need not be displaced axially to an appreciable extent.

Figure 6:
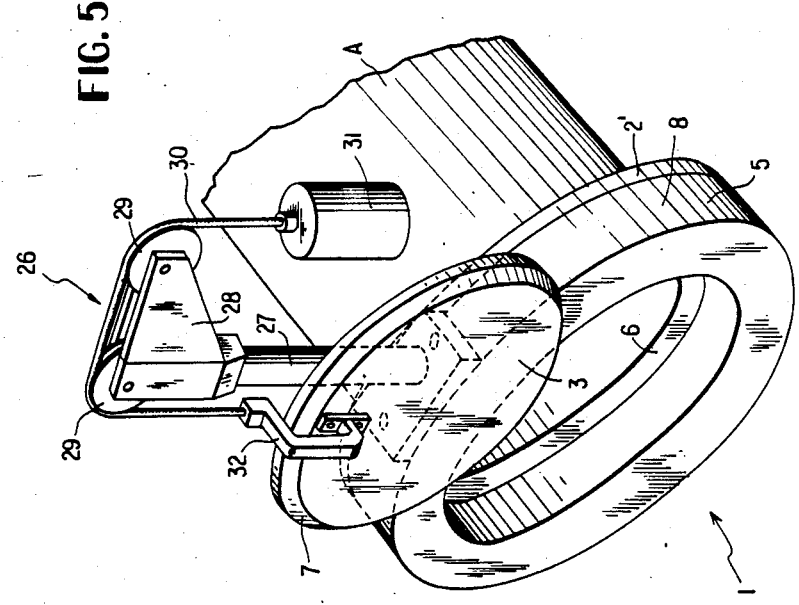
FIG. 6 is a schematic side elevational view of an installed nuclear fuel transfer tube incorporating the invention.

The invention may find particularly advantageous application as a quick-release hatch assembly for a fuel transfer system in a nuclear reactor installation as illustrated in schematic FIG. 6. In such a case the casing A shown in FIGS. 1 and 5 is a fuel transfer tube 33 which provides a passage between a refuelling cavity 34 in a containment area and a fuel handling area 35 of a nuclear power generating installation.

The hatch assembly 1 according to the invention is arranged at that end of the fuel transfer tube 33 which extends into the containment. The other end of the fuel transfer tube 33 which extends into the fuel handling area 35 is closed by a valve 36 which may be, for example, motor operated. As noted in the BACKGROUND OF THE INVENTION, a nuclear fuel transfer system of this type, including transfer equipment at both ends of the fuel transfer tube is described in U.S. Pat. No. 4,053,067. The advantages of the hatch assembly according to the invention, such as the possibility of rapid opening and closing, reliability of operation, simplicity of repair, low risk of damaging the bolting mechanism, small spatial requirement for the structure and for manipulation, a controlled axial force exertion in the locked positioned as well as the possibility of backfitting are of particular usefulness in nuclear installations.

It will be understood that the above description of the present invention is susceptible to various modifications, changes and adaptations, and the same are intended to be comprehended within the meaning and range of equivalents of the appended claims.

We claim:

1. A hatch assembly comprising
    (a) an annular seat adapted for an at least indirect affixation to a housing and defining a hatch opening;
    (b) a hatch cover adapted to be positioned on said annular seat for covering the hatch opening; and
    (c) a plurality of latching units supported about said opening, each said latching unit including
        (1) a slidably supported locking bolt movable generally radially inwardly with respect to said annular seat into a hatch cover locking position and generally radially outwardly with respect to said annular seat into a hatch cover releasing position; in said hatch cover locking position at least one length portion of said locking bolt extending over said hatch cover for maintaining said hatch cover on said annular seat;
        (2) a crankshaft supported for rotation;
        (3) operating means for transmitting a locking torque and an opposite, releasing torque to said crankshaft;
        (4) coupling means for connecting said crankshaft with said locking bolt and for converting rotary motion of said crankshaft to linear motion of said locking bolt, said coupling means including spring means for transmitting the locking torque from said crankshaft as a radially inwardly oriented resilient force to said locking bolt; and
        (5) means for resolving the radially inwardly oriented resilient force to a component force in said hatch cover locking position and for transmitting said component force from said locking bolt to said hatch cover for pressing said hatch cover against said annular seat.

2. A hatch assembly as defined in claim 1, further comprising an adjustable limit screw supported in a path of motion of said coupling means for varying an end position of said crankshaft for altering the magnitude of said radially inwardly oriented resilient force.

3. A hatch assembly as defined in claim 1, wherein said means for resolving the radially inwardly oriented resilient force comprises a chamfered surface forming part of said locking bolt and cooperating with said hatch cover.

4. A hatch assembly as defined in claim 1, wherein said means for resolving the radially inwardly oriented resilient force comprises a circumferential bevelled marginal outer surface forming part of said hatch cover and cooperating with said locking bolt.

5. A hatch assembly as defined in claim 1, wherein said coupling means further comprises a locking bolt pin operatively coupled to said crankshaft; a locking bolt screw connecting said locking bolt to said locking bolt pin and permitting a limited relative longitudinal movement between said locking bolt and said locking bolt pin; said spring means being situated between said locking bolt and said locking bolt pin for compression by said locking bolt and said locking bolt pin.

6. A hatch assembly as defined in claim 5, wherein said coupling means further comprises a crank link torque-transmittingly connected to said crankshaft and a connecting link articulated to said crank link and said locking bolt pin.

7. A hatch assembly as defined in claim 1, further comprising a hatch ring adapted for a direct affixation to a housing; said annular seat forming an integral part of said hatch ring and being surrounded thereby.

8. A hatch assembly as defined in claim 7, wherein each said latching unit further comprises a support bracket mounted on said hatch ring; said support bracket rotatably supporting said crankshaft.

9. A hatch assembly as defined in claim 8, further comprising an arm affixed to said crankshaft and extending generally radially therefrom; a securing pin removably supported in said support bracket; said securing pin being situated in a path of travel of said arm for blocking said arm in a first position in which said locking bolt is in said hatch cover locking position and in a second position in which said locking bolt is in said hatch cover releasing position.

10. A hatch assembly as defined in claim 9, wherein said operating means comprises an operating handle torque-transmittingly connected to said crankshaft; said operating handle constituting said arm.

11. A hatch assembly as defined in claim 1, further comprising a counterweight means operatively connected to said hatch cover for exerting an upwardly oriented force thereon.

12. A hatch assembly as defined in claim 11, wherein said counterweight means comprises a manually engageable handle affixed to said hatch cover; said handle transmitting said upwardly oriented force to said hatch cover.

13. A hatch assembly as defined in claim 1, wherein said operating means comprises an operating handle torque-transmittingly connected to said crankshaft.

14. In a nuclear reactor installation including means defining a fuel handling area and means defining a containment area separated from the fuel handling area and including a refuelling cavity; the improvement comprising (a) a fuel transfer tube connecting the refuelling cavity with the fuel handling area; said fuel transfer tube having a first end in the fuel handling area and a second end in the refuelling cavity;

(b) valve means for opening and closing said first end; and (c) a hatch assembly mounted on said second end; said hatch assembly including (1) a hatch ring affixed to said fuel transfer tube at said second end thereof; said hatch ring having an integral annular seat surrounded by said hatch ring and defining a hatch opening in said second end of said fuel transfer tube;

(2) a hatch cover adapted to be positioned on said annular seat for covering the hatch opening;

(3) a plurality of latching units supported on said hatch ring about said hatch opening, each said latching unit including (i) a slidably supported locking bolt movable generally radially inwardly with respect to said annular seat into a hatch cover locking position and generally radially outwardly with respect to said annular seat into a hatch cover releasing position; in said hatch cover locking position at least one length portion of said locking bolt extending over said hatch cover for maintaining said hatch cover on said annular seat;

(ii) a crankshaft supported for rotation;

(iii) operating means for transmitting a locking torque and an opposite, releasing torque to said crankshaft;

(iv) coupling means for connecting said crankshaft with said locking bolt and for converting rotary motion of said crankshaft to linear motion of said locking bolt, said coupling means including spring means for transmitting the locking torque from said crankshaft as a radially inwardly oriented resilient force to said locking bolt; and (v) means for resolving the radially inwardly oriented resilient force to a component force in said hatch cover locking position and for transmitting said component force from said locking bolt to said hatch cover for pressing said hatch cover against said annular seat.

15. A hatch assembly as defined in claim 1, said operating means comprising an operating handle torque-transmittingly connected to said crankshaft and being arranged for swinging motion in a plane parallel to a plane in which said hatch opening lies.

* * * * *